United States Patent [19]

Airhart

[11] 4,219,096
[45] Aug. 26, 1980

[54] SUBMERGIBLE MARINE SEISMIC SOURCE

[75] Inventor: Tom P. Airhart, Plano, Tex.

[73] Assignee: Atlantic Richfield Company, Los Angeles, Calif.

[21] Appl. No.: 306

[22] Filed: Jan. 2, 1979

[51] Int. Cl.³ ............................................. G01V 1/38
[52] U.S. Cl. .................................. 181/113; 181/118; 181/120; 181/116; 181/402; 367/75
[58] Field of Search ................. 367/75; 181/106, 113, 181/116, 117, 118, 119, 120, 401, 402

[56] References Cited

U.S. PATENT DOCUMENTS

| | | | |
|---|---|---|---|
| 2,691,939 | 10/1954 | Hintze | 102/23 |
| 2,760,591 | 8/1956 | White et al. | 367/75 |
| 3,919,684 | 11/1975 | Reed | 181/118 |
| 4,016,952 | 4/1977 | Reed et al. | 181/116 |
| 4,059,820 | 11/1977 | Turpening | 367/75 |

*Primary Examiner*—Howard A. Birmiel
*Attorney, Agent, or Firm*—Robert M. Betz

[57] ABSTRACT

A marine seismic source employs a cylindrical gas exploder adapted to be supported from a surface vessel in a submerged state adjacent a marine bottom. The force of expanding gases within the exploder applies a thrust along the exploder longitudinal axis to a ground contact member operatively interconnected with the exploder to produce a seismic signal. The energy producing force is reacted by piston means within the exploder interconnected rigidly with a large area external water interacting disk. The mass of the reaction piston-disk system is sufficiently great so that the slow moving disk experiences viscous damping in the water and thus generates no significant undesirable secondary seismic signal in the water. The exploder may be oriented horizontally for maximum generation of shear waves or inclined at an acute angle to the vertical for generation of a combination of shear waves and compressional waves.

1 Claim, 5 Drawing Figures

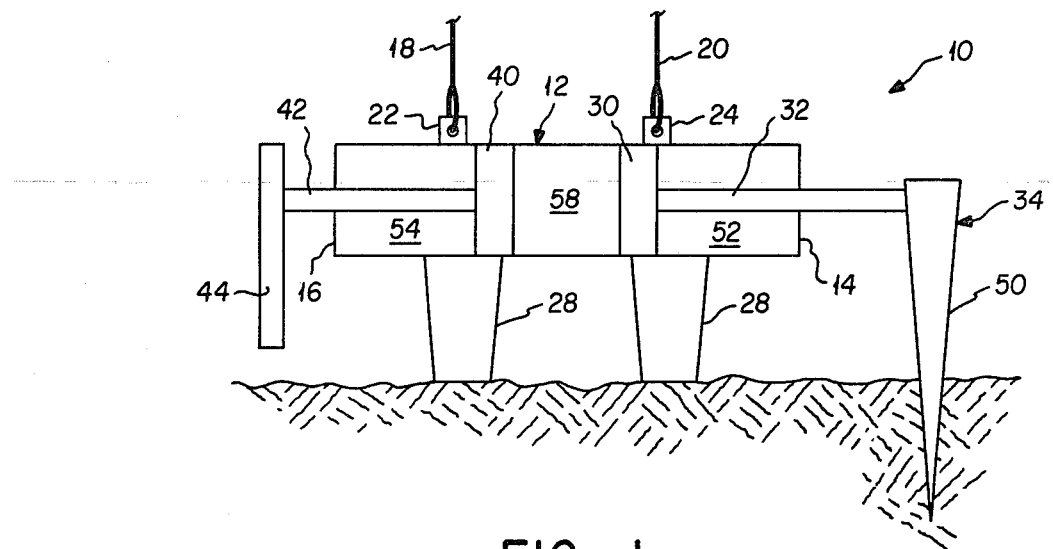
FIG. 1
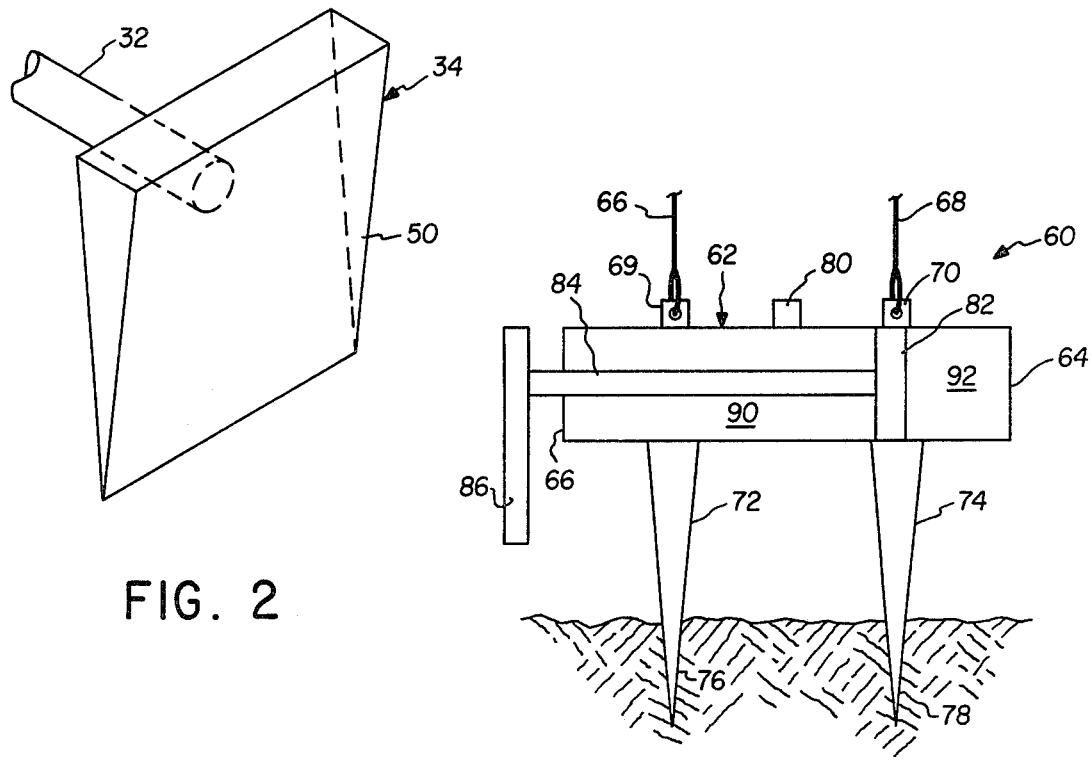
FIG. 2
FIG. 3

SUBMERGIBLE MARINE SEISMIC SOURCE

BACKGROUND OF THE INVENTION

I. Field of the Invention

This invention relates to apparatus and methods for geophysical prospecting by propagating seismic waves in the earth and moe particularly to apparatus of this character adapted for use in a marine environment to generate shear waves either alone or in combination with compressional waves.

II. Prior Art

Existing underwater seismic devices are well known which are designed to produce compressional waves in the water, which in turn are transmitted to the marine bottom and there propagated in the earth. Such devices, however, are clearly incapable of generating shear waves.

In order to propagate shear waves in a marine environment, means must be devised for coupling the energy of a seismic source directly into the marine bottom rather than through the medium of the water. This is the basic problem and objective to which applicant's invention is addressed.

SUMMARY OF THE INVENTION

In accordance with the preferred embodiment of the present invention, adapted particularly for the production of shear waves, an underwater seismic source includes a closed-ended cylindrical gas exploder housing supportable so that its longitudinal axis is in a horizontal direction. The housing is coupled to the marine bottom by means of a ground contact member provided with a downwardly tapering blade portion facilitating penetration into the material of the marine bottom. Detonation of a combustible gas mixture in an expansible combustion chamber within the housing applies an axial force to thrust the ground contact member forward along a horizontal path against the material of the marine bottom, the blade face being oriented transversely to the direction of the force. Reaction to the forward thrust against the ground contact member drives a reaction piston in the opposite direction independently of the housing, the reaction piston being interconnected with an external water interactive member offset with respect to the axis of the housing so that the center of resistance of the water lies below such axis. In this manner the resistance of the water opposes any tendency of the exploder to translate in a recoil direction while the eccentricity of the disk results in a force moment opposing any upsetting moment generated by the earth's reaction to the forward thrust of the blade.

In an alternate embodiment of this invention, a device of the character described is oriented so that its longitudinal axis is inclined at an acute angle to the vertical, the blade face being oriented transversely to the horizontal component of an axially directed force furnished by such device. This alternate embodiment is designed to produce both shear and compressional waves.

BRIEF DESCRIPTION OF THE DRAWINGS

FIG. 1 is a diagrammatic view of a device in accordance with the preferred embodiment of this invention for producing horizontal shear waves.

FIG. 2 is a detail of the bladed ground contact member of FIG. 1.

FIG. 3 is a diagrammatic view of a device in accordance with an alternate embodiment of this invention.

DESCRIPTION OF THE PREFERRED EMBODIMENTS

Figure 4:
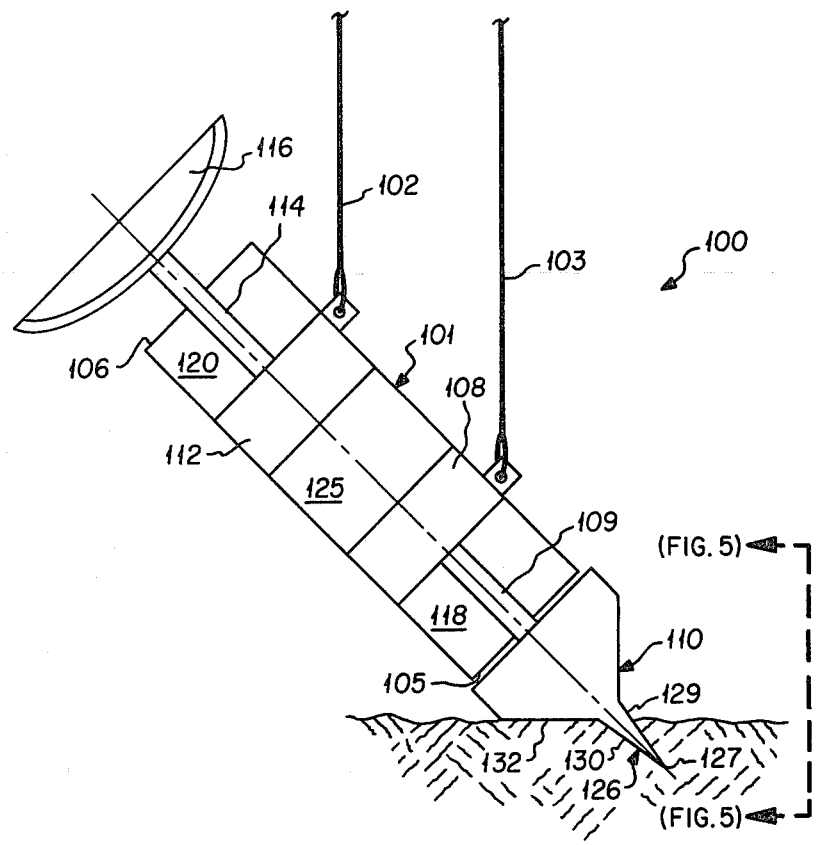
FIG. 4 is a device in accordance with a further alternate embodiment of this invention.

With reference now to the drawings, FIG. 1 illustrates a submerged marine seismic gas exploder 10 in accordance with the preferred embodiment of this invention, which is primarily adapted to produce shear waves. The exploder 10 includes an elongated cylindrical housing 12 having closed forward and aft ends 14 and 16. The exploder 10 is lowered into position from any suitable surface vessel by means of tensioned cables 18 and 20 attached to external brackets 22 and 24. In order to support exploder 10 in its horizontal position as shown, a plurality of sturdy wide bottomed supports 28 are affixed to the undersurface of the housing 12 so that supports 28 may rest on the marine bottom.

Within the housing 12 a generator piston 30 is interconnected by means of rod 32, passing through closed forward end 14, to upstanding ground contact member 34. Spaced from generator piston 30 is a reaction piston 40 interconnected by means of a piston rod 42 through aft end 16, with external upstanding water interaction disc 44.

As best seen in FIG. 2, ground contact member 34 preferably has a downwardly tapering wedge shape wherein forward face 50 is oriented generally perpendicular to the axis of exploder 10. The reactive system consisting of piston 40, piston rod 42 and water interactive member 44 has high inertia relative to the forwardly moving system consisting of generator piston 30, piston rod 32, and ground contact member 34. Further, it will be noted that, for reasons to be explained, water interaction disk 44 is eccentrically positioned in a downward direction with respect to the axis of housing 10.

The annular spaces surrounding rods 32 and 42 constitute pressurized pneumatic chambers 52 and 54. As will be seen, the purpose of these chambers is to generally to insure that pistons 30 and 40 do not impact respective ends 14 and 16 and that they return to their initial positions after the device is fired.

The space between pistons 30 and 40 constitutes a combustion chamber adapted to be filled with a combustible gas mixture such as oxygen and propane. In the interest of clarity, neither FIG. 1 nor the accompanying description makes reference to the means such as hoses, cables, valves and the like for filling, electrically sparkking, and scavenging the combustion chamber 58 or pressurizing or bleeding chambers 52 and 54. These details are well known to those versed in the art of seismic gas exploders and form no part of this invention. The same considerations will apply with respect to other embodiments of this invention to be described hereafter.

When exploder 10 is lowered into position the ground contact member 34 is adapted to penetrate the marine bottom sufficiently so that a substantial portion of the face 50 will be available to establish efficient earth couple.

In operation, detonation of a combustible gas mixture in chamber 58 thrusts ground contact member 34 forwardly while reaction piston 40 recoils in the opposite direction. The housing 12 should therefore remain substantially stationary during the firing of exploder 10. The reason for making the reaction system relatively massive is so that it will move slowly and be damped in a viscous manner by the surrounding water, thus minimizing undesirable secondary compressive seismic pulse.

A force directed axially of the housing 12 will, because of the reaction of the earth at the marine bottom, produce a clockwise moment in the sense of FIG. 1, tending to upset or overturn the exploder 10. In order to counteract this upsetting or overturning moment, the disk 44 is mounted so as to be offset from the axis of the housing 12. The purpose of this eccentricity is that the center of reaction of the water should lie below such axis. This in turn produces, in combination with the recoil force on piston 40, an opposing counterclockwise moment, thereby efficiently stabilizing the exploder 10.

It will be noted that this is a completely selfcontained system, in that the reaction of the surrounding water environment supplants the need for any transporting vehicle or platform to react against.

Within the scope of this invention both the ground coupling member 34 and the water interaction disk 44 may be considerably altered in size and shape as long as the essential functions as described are accomplished. For example, the ground contact member 34 may be significantly shortened or lengthened depending upon marine bottom conditions. Since the particular characteristics of a marine bottom naturally vary widely, it may be necessary in some instances to apply external means to force the ground contact member 34 into the marine bottom sufficiently to achieve the desired earth couple. Also, the water interactive member 44 may be given a concave disk shape if desired. Those familiar with hydrodynamics will easily be able to devise particular configurations for member 44 of maximum effectiveness.

FIG. 3 illustrates a marine seismic gas exploder 60 in accordance with an alternate embodiment of this invention. Exploder 60 is again designed to generate primarily shear wave seismic signals. A cylindrical housing 62 with forward and aft closed end 64 and 66 is lowered into ground contacting position by means of tensioned cables 66 and 68 attached by means of brackets 69 and 70 to the external surface of the housing 62. Extending downwardly from and fixed to housing 62 are wedge shaped downwardly tapering ground contact members 72 and 74 adapted to penetrate into the marine bottom sufficiently to establish efficient earth couple over the surface area of forward faces 76 and 78 thereof. In loose sand bottoms, good ground contact may be achieved with this device by means of a vibrator 80 attached to the surface of the housing 62. As such a vibrator is operated, the loose sand will tend to give way and the exploder 60 will seat itself more deeply and firmly in a more densely compacted sand surrounding.

Internally, the housing 62 contains a reaction piston 82 interconnected by means of a rod 84 to the aft end 66 of housing 62 with an upstanding water interaction member 86. It will be noted that interaction member 86, preferably a large area disk, is offset downwardly with respect to the axis of the housing 62. The annular space surrounding the rod 84 is a pressurized pneumatic chamber 90 and the space between piston 82 and forward end 64 forms an expansible combustion chamber 92.

In operation, detonation, by well known means, of a combustible fuel mixture in chamber 92, drives the entire housing 62 forwardly, thereby propelling the ground contact member 72 and 74 in a horizontal direction to produce the shear seismic wave of interest. In reaction, piston 82 urges water interaction disk 86 against the mass of the surrounding water independently of the housing 62. Pressurized chamber 90 thereafter returns piston 82 to its initial position. In the manner previously described for the embodiment of FIG. 1, the eccentricity of disk 86 results in a reactive force moment due to water resistance which balances the upsetting moment produced by the forward thrust of ground contact members 72 and 74.

If it is desired as an aid in seating the exploder 60 in dense sand, pressurized water or air jets (not shown) may be fixed to the ground contact member 72 and 74. If, on the other hand exploder 60 contacts a soft mud bottom, the weight of the device itself will tend to force member 72 and 74 into the ground. If a stiffer mud bottom condition is encountered, a mounted hammer may be required to establish proper contact.

A marine seismic exploder 100 in accordance with a second alternate embodiment of this invention is illustrated diagrammatically in FIG. 4. Exploder 100 differs from the previous embodiments of this invention in that it is supported at an acute angle to the vertical for the purpose of generating combined shear and compressional waves.

A housing 101, conveniently supported from a surface vessel by means of tensioned cables 102 and 103, has lower and upper closed ends 105 and 106. A generator piston 108 is interconnected by means of axial piston rod 109, extending through lower end 105, with a wedge shaped ground contact member 110. Spaced from generator piston 108 is reaction piston 112 interconnected to axial rod 114 with smoothly contoured water interactive disk 116. In similar fashion to the previous embodiments, the annular spaces 118 and 120 surrounding rods 109 and 114 respectively are gas pressurized for limiting maximum travel and providing for return of pistons 108 and 112 during and after the device is fired.

Figure 5:
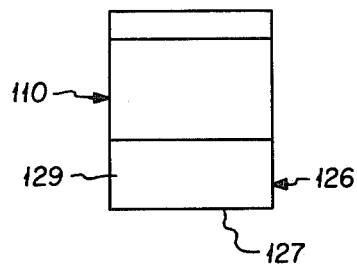
FIG. 5 is an elevational view taken along the line 5—5 in FIG. 4.

In operation, detonation of a combustible gas mixture in central chamber 125 drives piston 108 downwardly and thrusts ground contact member 110 into the marine bottom in the direction of the longitudinal axis of the housing 101. As best seen in FIG. 5, the tapered lower end of ground contact member 110 consists of a blade portion 126, projecting downwardly to leading edge 127. Details of the contour of the ground coupling member 110 and its function in generation of combined compressional and shear waves is the subject of a separate copending patent application, Ser. No. 307, filed of even date herewith, entitled BIDIRECTIONAL GROUND COUPLING MEANS FOR INCLINED SEISMIC SOURCE in the name of Tom Patterson Airhart, and commonly assigned herewith. The faces 129 and 130 of blade 126 are oriented generally transverse to the direction of the horizontal component of the axial force against ground contact member 110. As the ground contact member 110 is thrust axially of the housing 110, the face 129 of blade portion 126 necessarily thrusts against the earth horizontally for shear wave production while the corresponding downward movement of side 132 interfacing the surface of the marine bottom produces the compressional component of the seismic wave.

In reaction to the seismic thrust of this device, the reaction piston 112 moves upwardly slowly and carries with it the water interaction member 116 so as to dissipate the recoil energy against the surrounding water in a non-noise producing manner. As with previous embodiments of this invention, it is seen that this reactive system is independent of housing 101 and also independent of any surrounding static structures.

What is claimed is:

1. A device for propagating seismic waves in a marine bottom comprising a submergible cylindrical housing having enclosed forward and aft ends, a ground contact member operatively interconnected with said device and adapted to penetrate said marine bottom, means for generating a force within said housing along the longitudinal axis thereof, means for transmitting said force to said ground contact member, thereby urging said ground contact member in the direction of said axis, whereby said seismic waves may be propagated within said marine bottom, and means movable independently of said housing for reacting said force against the surrounding water, said means including a force reaction member movable within said housing along said longitudinal axis and a water interacting member external to said housing rigidly connected to said force reaction member, wherein the center of water resistance to the movement of said water interacting member is offset from said longitudinal axis.

* * * * *